(12) United States Patent
Sim et al.

(10) Patent No.: US 10,113,471 B2
(45) Date of Patent: *Oct. 30, 2018

(54) MULTILAYER COMPOSITE PANEL

(71) Applicants: Hyundai Motor Company, Seoul (KR); Kia Motors Corporation, Seoul (KR); Saehan Industrial Co., Ltd., Siheung, Gyeonggi-Do (KR)

(72) Inventors: Jaegi Sim, Seoul (KR); Sungjin Park, Gyeonggi-Do (KR); Sunghoon Yoon, Gyeonggi-Do (KR)

(73) Assignees: Hyundai Motor Company, Seoul (KR); Kia Motors Corporation, Seoul (KR); Saehan Industrial Co., Ltd., Siheung, Gyeonggi-do (KR)

(*) Notice: Subject to any disclaimer, the term of this patent is extended or adjusted under 35 U.S.C. 154(b) by 686 days.

This patent is subject to a terminal disclaimer.

(21) Appl. No.: 14/567,591

(22) Filed: Dec. 11, 2014

(65) Prior Publication Data

US 2015/0184573 A1 Jul. 2, 2015

Related U.S. Application Data

(63) Continuation-in-part of application No. 14/520,991, filed on Oct. 22, 2014, now Pat. No. 9,688,054.

(30) Foreign Application Priority Data

Dec. 31, 2013 (KR) ........................ 10-2013-0168490

(51) Int. Cl.
*F01N 13/14* (2010.01)
*B32B 3/28* (2006.01)
(Continued)

(52) U.S. Cl.
CPC .............. *F01N 13/148* (2013.01); *B32B 3/12* (2013.01); *B32B 3/28* (2013.01); *B32B 15/01* (2013.01);
(Continued)

(58) Field of Classification Search
CPC ....................... F01N 13/148; Y10T 428/12417
See application file for complete search history.

(56) References Cited

U.S. PATENT DOCUMENTS 6,231,944 B1 5/2001 Holt
6,276,044 B1 8/2001 Ragland et al.
(Continued)

FOREIGN PATENT DOCUMENTS

CN 2617573 Y 5/2004
CN 1781701 A 6/2006
(Continued)

*Primary Examiner* — Adam Krupicka
(74) *Attorney, Agent, or Firm* — Mintz Levin Cohn Ferris Glovsky and Popeo, P.C.; Peter F. Corless (57) ABSTRACT

Disclosed is a multi-layered composite panel. The multi-layered composite panel comprises at least two sheets of thin plates with continuous waveform patterns having the same pitch and different heights in one direction are overlapped. In the multi-layered composite panel, an adiabatic layer is formed between the overlapping thin plates, diagonal pressing portions, which divide the waveform patterns on the top and the bottom of the thin plates into the unit of triangle-patterned cell by being pressed diagonally to cross each other on the top and the bottom of the thin plates overlapping in the diagonal direction crossing the direction of the waveform patterns, are formed and an undercut portion is formed by pressing the centers of both sides connecting a groove and a ridge of each cell on the top and the bottom of the thin plates with opposite diagonal pressing portions.

20 Claims, 9 Drawing Sheets

(51) Int. Cl.
*B32B 3/12* (2006.01)
*B32B 15/01* (2006.01)
*F01N 13/10* (2010.01)

(52) U.S. Cl.
CPC ............ *B32B 15/016* (2013.01); *F01N 13/10* (2013.01); *F01N 2260/20* (2013.01); *Y10T 29/49366* (2015.01); *Y10T 428/1234* (2015.01); *Y10T 428/24661* (2015.01)

(56) References Cited

U.S. PATENT DOCUMENTS

| | | |
|---|---|---|
| 6,391,469 B1 | 5/2002 | Ragland et al. |
| 6,647,715 B2 | 11/2003 | Farkas |
| 2003/0101719 A1 | 6/2003 | Farkas |
| 2011/0094824 A1 | 4/2011 | Akimoto et al. |

FOREIGN PATENT DOCUMENTS

| | | |
|---|---|---|
| CN | 201041080 Y | 3/2008 |
| CN | 201483837 U | 5/2010 |
| CN | 201794224 U | 4/2011 |
| CN | 102493829 A | 6/2012 |
| KR | 10-2010-0133017 A | 12/2010 |

FIG. 1

RELATED ART

| Physical | | | Related art | Invention |
|---|---|---|---|---|
| Physical property estimation | Separation strength | X direction | 2.7 N/mm | 3.1N/mm (Test impossible) (Fastening force maintained until base material breaks) |
| | | Y direction | 1.8 N/mm | 3.4 N/mm |
| | Tensile strength | X direction | 66 Mpa | 90.3 Mpa |
| | | Y direction | 51 Mpa | 42 Mpa |
| Thermal property estimation | Hot Plate Test(150°C) | | 75.4°C | 72.2°C |
| | Heat dissipation test | | 33.9/300°C | 33.6/300°C |
| | | | 39.4/400°C | 37.6/400°C |
| | | | 46.5/500°C | 40.6/500°C |
| Environment estimation | Impact noise | | 99.1dB | 90.3dB |
| | Sound absorbing/ blocking test | | Amount of blocked sound : 18dB | Amount of blocked sound : 21dB |
| | Anti-vibration test | | Good | Good |

FIG. 9

| Heat source temperature | 500℃ | 600℃ |
|---|---|---|
| Multi-layered composite panel (aerogel) | 130 | 140 |
| Multi-layered composite panel (air layer) | 157 | 167 |
| Single aluminum panel | 159 | 195 |

MULTILAYER COMPOSITE PANEL

CROSS-REFERENCE TO RELATED APPLICATIONS

This application claims priority to and the benefit of Korean Patent Application No. 10-2013-0168490 filed in the Korean Intellectual Property Office on Dec. 31, 2013, and U.S. patent application Ser. No. 14/520,991 filed in the United States Patent and Trademark Office on Nov. 3, 2014, the entire contents of which are incorporated herein by reference.

TECHNICAL FIELD

The present invention relates to a multi-layered composite panel. Particularly, the multi-layered composite panel in the present invention may improve heat-blocking, heat-dissipating, and soundproofing properties by forming a plurality of thin plates in a predetermined pattern.

BACKGROUND

Recently, vehicle manufacturers have been focused on research and development of reducing the weight of vehicles by downsizing the engines and to increase fuel efficiency by increasing the power of engines. With an increase in efficiency of engines, the exhaust systems including exhaust manifold, exhaust pipe, catalyst and the like are exposed to substantially elevated temperatures than those in past. Accordingly, there is a need for increasing the performance of heat protectors, for example, heat shield and heat insulator.

Figure 1:
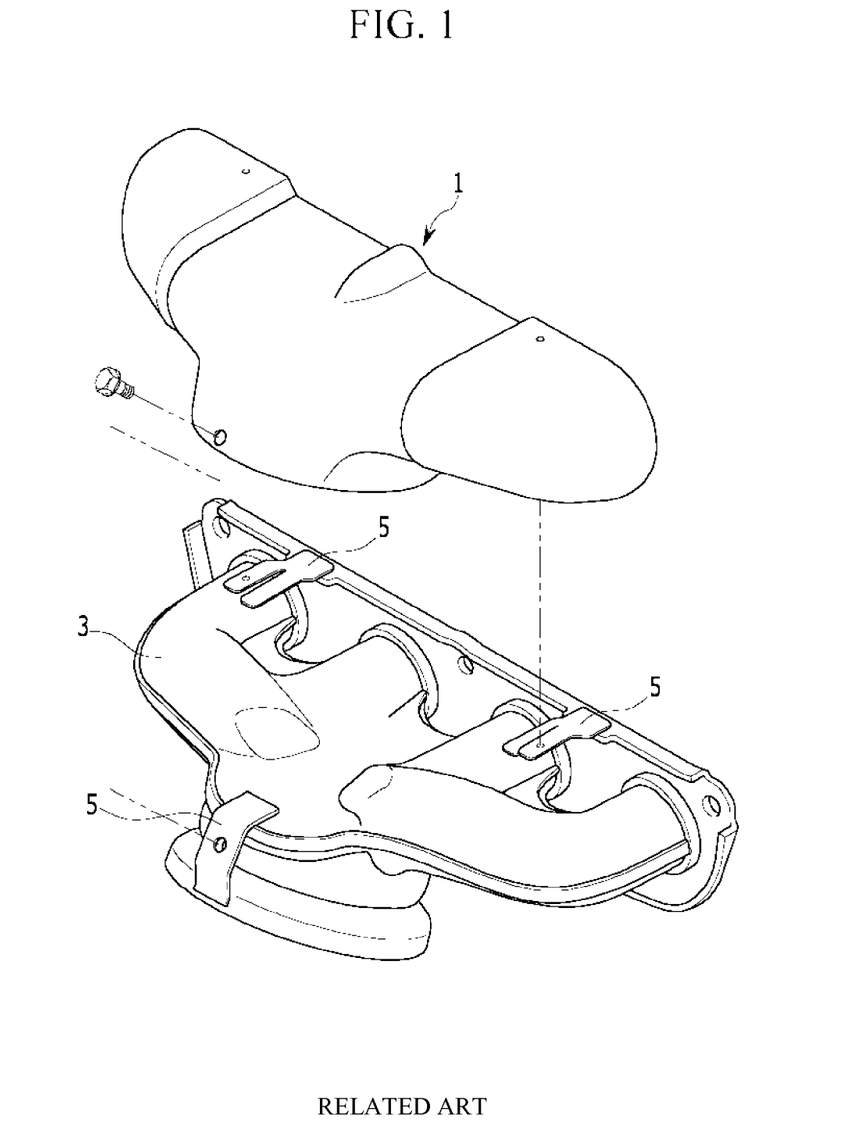
FIG. 1 illustrates an exemplary view of an exhaust manifold with a convention heat protector in the related art.

FIG. 1 shows an exemplary view of an exhaust manifold with a conventional heat protector in the art. Referring to FIG. 1, a heat protector 1 is fastened to the top of an exhaust manifold via three brackets 5 and dissipates the heat emitted from an exhaust gas discharged through the exhaust manifold 3. For the heat protector 1, an aluminum-coated steel plate has typically been typically, but aluminum thin plates that are advantageous in weight reduction and function of vehicles have been recently used. Aluminum thin plates have the advantages of high thermal conductivity and excellent heat dissipation. However, aluminum thin plates may be disadvantageous due to complicated shapes of manifolds as a heat protector. As consequence, durability such as tearing and cracks may be formed and noise due to vibration of engines may occur.

Accordingly, in some efforts, heat protectors having improved durability and complemented heat dissipation ability with air has been recently introduced and the heat protectors are manufactured by overlapping two or more sheets of aluminum thin plates and adding various shapes, such as embossing, prominences and depressions, waveforms and the like. However, when two aluminum thin plates are pressed to form a heat protector, technical difficulties may occur in forming such as separation of plates and vibration and noise may still remain after they are formed in a heat protector. Further, the heat-blocking ability may be reduced at an activation temperature or less of a catalyst where thermal efficiency is required to increase in the early stage of traveling. In other words, maximizing the efficiency of an engine may be obtained only by blocking heat at a predetermined level up to the activation temperature of a catalyst in the early stage of driving of a vehicle, but the time to reach the activation temperature of a catalyst may increase, when only the conductivity and heat dissipation of aluminum are considered. Further, for the aluminum thin plates of the related art, two sheets of thin flat plates are overlapped and formed in one waveform pattern, such that an air layer is formed. However, only heat-blocking and heat-dissipating characteristics with simple waveform patterns may be obtained, and the heat-blocking characteristic in the early stage of operation of an engine and the heat-dissipation characteristic cannot be simultaneously obtained. Further, due to insufficient air layer, soundproofing effect for blocking noise caused by vibration may be limited.

The above information disclosed in this Background section is only for enhancement of understanding of the background of the invention and therefore it may contain information that does not form the prior art that is already known in this country to a person of ordinary skill in the art.

SUMMARY

The present invention provides technical solutions to the above technical difficulties. In one aspect, disclosed is a multi-layered composite panel having advantages of improved heat-blocking and heat-dissipating characteristics and soundproofing ability. Such advantages may be obtained by maintaining continuous closed an adiabatic layer uniformly formed throughout the plate, by dividing closed air layers in the unit of triangle-patterned cell, by overlapping two or more sheets of thin plates with continuous waveform patterns with different heights, by forming the adiabatic layer with a predetermined height between the thin plates, and by forming diagonal pressing portions with regular (e.g., predetermined) intervals in the diagonal direction crossing the waveform patterns on the thin plates.

Further, the present invention provides a multi-layered composite panel having improved formability by forming rigid directionality in the diagonal direction together with the waveform direction, particularly by regularly forming triangular patterns (e.g., forming predetermined triangular patterns) divided by the diagonal pressing portions with the edge of ridge and the groove of each cell as one side. The present invention also provides a multi-layered composite panel having improved formability by preventing separation of plates using an undercut portion formed by continuously pressing the centers of the sides connecting the groove and the ridges of cells of overlapping thin plates with diagonal pressing portions.

In an exemplary embodiment of the present invention, a multi-layered composite panel may include two sheets of thin plates, in which the two sheets of thin plates with continuous waveform patterns may have the same pitch and different heights in one direction and may be overlapped, such that an adiabatic layer is formed between the overlapping thin plates. In addition, in the multi-layered composite panel, diagonal pressing portions, which divide the waveform patterns on the top and the bottom of the thin plates into the unit of triangle-patterned cell by being pressed diagonally to cross each other on the top and the bottom of the thin plates overlapping in the diagonal direction crossing the direction of the waveform patterns, may be formed. Further, an undercut portion may be formed by pressing the centers of both sides connecting a groove and a ridge of each cell on the top and the bottom of the thin plates with opposite diagonal pressing portions.

The adiabatic layer may be formed to be closed in the unit of triangle-patterned cell between the overlapping thin plates by the diagonal pressing portions between the ridge and the ridge and between the groove and the groove. The overlapping thin plates may be a top plate and a bottom plate, which are made of aluminum. The overlapping thin plates may be a top plate and a bottom plate which have the same thickness. Alternatively, the overlapping thin plates may be a top plate and a bottom plate which have different thicknesses, without limitation.

The waveform pattern may be a sine waveform pattern continuous in one direction. The diagonal pressing portions may be formed by pressing, in the zigzag shape on the top and the bottom of the overlapping thin plates. In particular, the thin plates may be in contact with each other at the diagonal pressing portions. The unit cell may include a triangle-patterned closed air layer formed between the overlapping thin plates by the diagonal pressing portions between the ridge and the ridge and between the groove and the groove. The crossing diagonal directions may have an acute angle and an obtuse angle with respect to the direction of the waveform patterns.

The adiabatic layer may be configured to be an air layer or filled with inorganic heat insulting material including at least one of silicon dioxide powder ($SiO_2$ power), aluminum oxide power ($Al_2O_3$ power), vermiculite, silica, aerogel ($SiO_2$), or fumed silica ($SiO_2$).

The multi-layered composite panel according to various exemplary embodiments of the present invention may have improved heat-blocking and heat-dissipating characteristics and soundproofing ability by securing continuous closed adiabatic layer substantially uniformly formed throughout the plate, by dividing closed adiabatic layer in the unit of triangle-patterned cell, by overlapping two or more sheets of thin plates with continuous waveform patterns with different heights, by forming the adiabatic layer with a predetermined height between the thin plates, and by forming diagonal pressing portions with regular intervals in the diagonal direction to the direction of the waveform patterns on the thin plates. The heat-dissipating ability may be further improved by the conductive characteristic of materials such as aluminum thin plates. According to various exemplary embodiments, since the triangular patterns divided by the diagonal pressing portions may be formed regularly (e.g., at predetermined intervals) with the edge of ridge and the groove of each cell as one side, forming rigid directionality may be obtained even in the diagonal direction together with the waveform direction when a product is formed, such that formability the multi-layered composite panel may be improved. Accordingly, when a heat protector is made of the multi-layered composite panel according to an exemplary embodiment of the present invention, the effect of heat blocking at the early stage of engine start may be improved, and when the engine temperature is elevated to a high temperature range, the effect of heat dissipation may be maximized with the surface extension by the expanded beads and with the substantial conductive property of aluminum.

In addition, formability of a product using the multi-layered composite panel may be improved by preventing separation of plates using an undercut portion formed by continuously pressing the centers of the sides connecting the groove and the ridges of cells of overlapping thin plates with diagonal pressing portions. Further, since the sides of the cell are all symmetric, when the plate is manufactured into a heat protector, stress concentration portion may not be generated.

As such, the multi-layered composite layer according to an exemplary embodiment of the present invention has an ability of blocking thermal damage by improve heat-blocking and heat-dissipating abilities and has excellent soundproofing ability by forming uniform adiabatic layers, in comparison to the related art, such that it is possible to make a heat protector of one material and the manufacturing cost can be reduced accordingly. In another aspect, a heat protector of a vehicle manufactured from the multi-layered composite layer is provided.

Other aspect of the present invention is also disclosed infra.

BRIEF DESCRIPTION OF THE DRAWINGS

The above and other objects, features and advantages of the present invention will be more clearly understood from the following detailed description taken in conjunction with the accompanying drawing.

Reference numerals set forth in the FIGS. 1-9 include reference to the following elements as further discussed below:

1: heat protector
3: exhaust manifold
5: bracket
10: multi-layered composite material
11: top plate
13: bottom plate
15*a*, 15*b*: top and bottom diagonal pressing portion
17: cell
19: undercut portion
S: adiabatic layer

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings. The sizes and thicknesses of the configurations shown in the drawings are provided selectively for the convenience of description, such that the present invention is not limited to those shown in the drawings and the thicknesses are exaggerated to make some parts and regions clear. The unrelated parts to the description of the exemplary embodiments are not shown to make the description clear and like reference numerals designate like element throughout the specification.

In one aspect, the present invention provides a multi-layered composite panel. The multi-layered composite panel 10 may be a material for manufacturing a heat protector 1 by pressing to fit the outer shape of one side of the heat-generating portion of an engine, or an exhaust system including an exhaust manifold 3, an exhaust pipe, and a catalyst.

Figure 2:
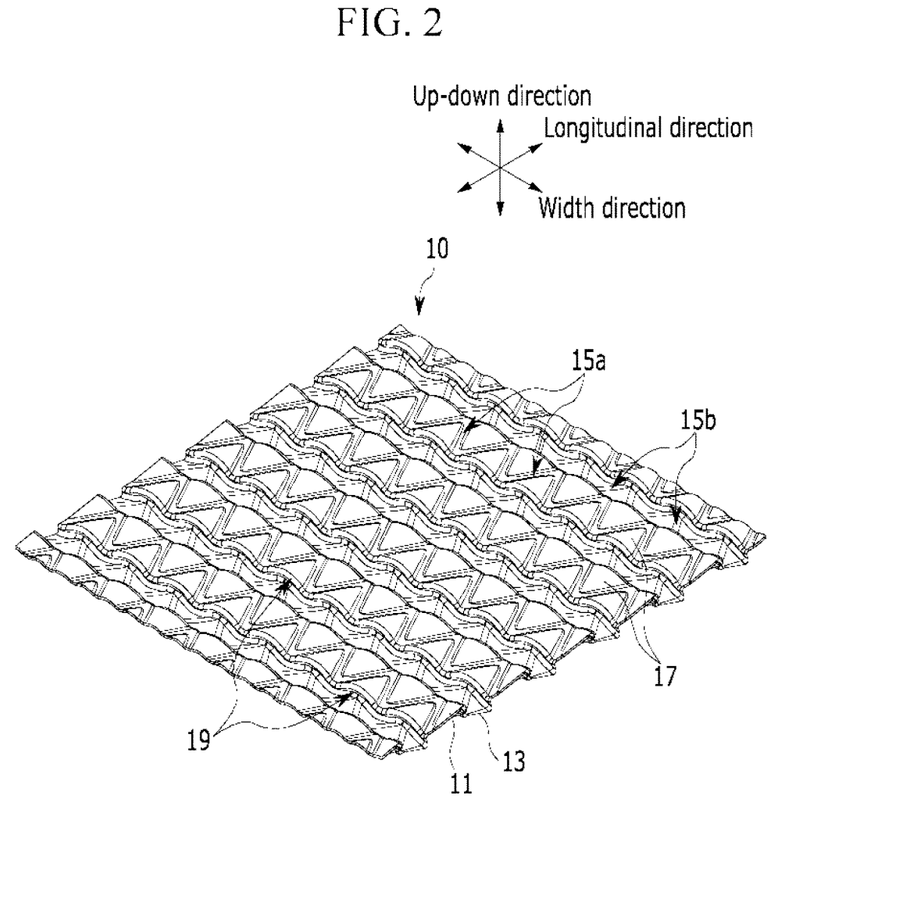
FIG. 2 illustrates an exemplary view on the top of an exemplary multi-layered composite panel according to an exemplary embodiment of the present invention.
Figure 3:
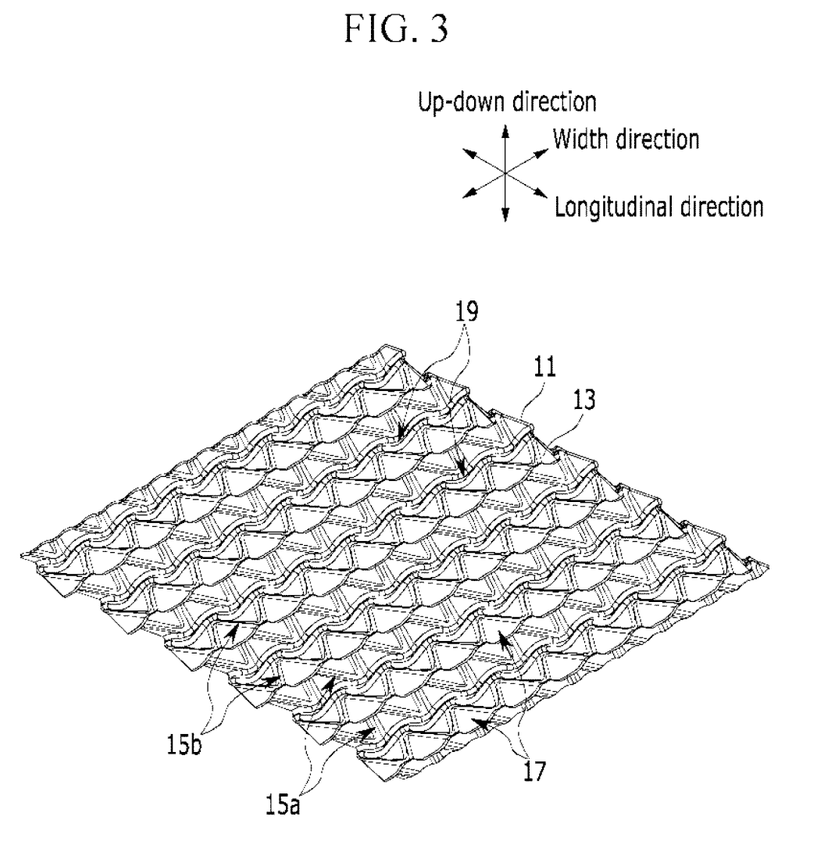
FIG. 3 illustrates an exemplary perspective view at the bottom of an exemplary multi-layered composite panel according to an exemplary embodiment of the present invention.

In the description of exemplary embodiments of the present invention, for the convenience of description, in FIGS. 2-3, the direction from the left lower portion to the right upper portion is the length direction, the direction from the left upper portion to the right lower portion is the width direction, and the direction from the lower portion and the upper portion is the up-down direction.

FIG. 2 illustrates an exemplary perspective view of the top of an exemplary multi-layered composite panel according to an exemplary embodiment of the present invention, FIG. 3 illustrates an exemplary perspective view of the bottom of an exemplary multi-layered composite panel according to an exemplary embodiment of the present invention. Further, FIG. 4 is an exemplary top plan view of an exemplay multi-layered composite panel according to an exemplary embodiment of the present invention.

Figure 4:
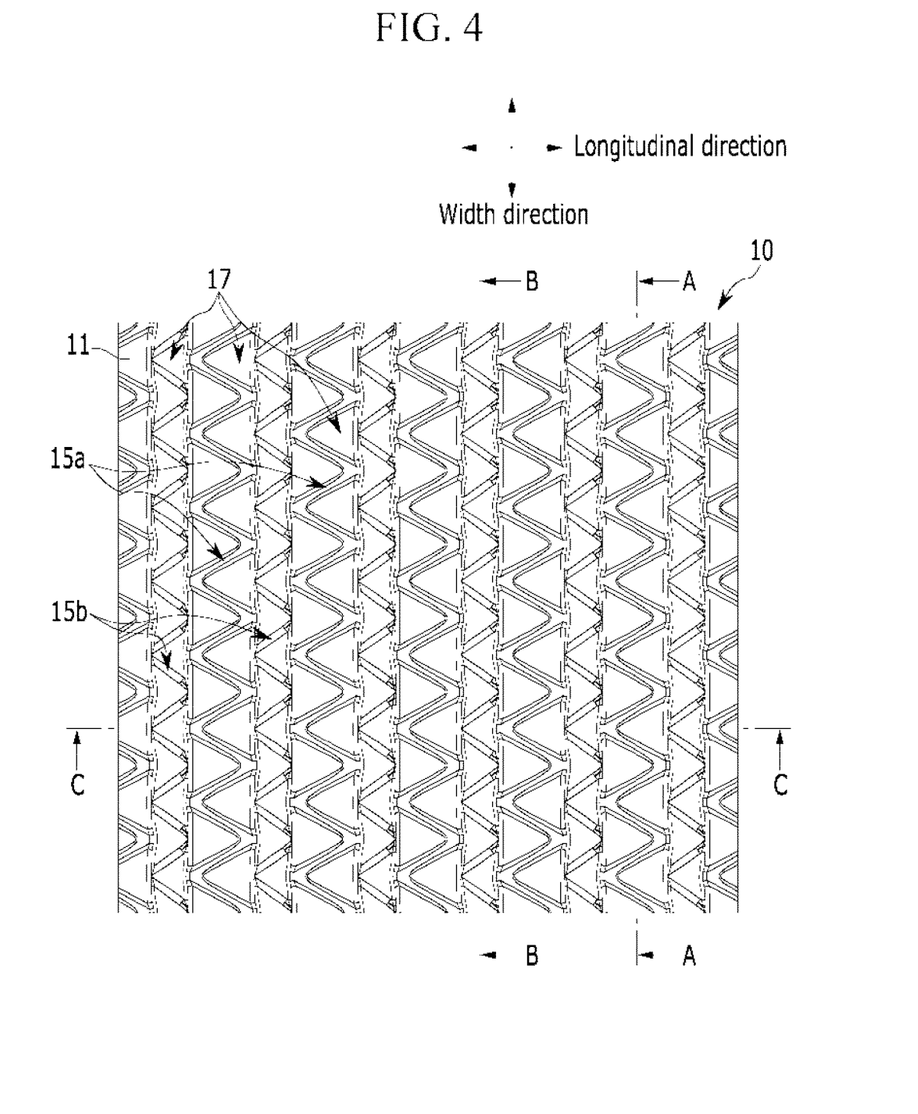
FIG. 4 illustrates an exemplary top plan view of an exemplary multi-layered composite panel according to an exemplary embodiment of the present invention.

Referring to FIGS. 2 and 4, the multi-layered composite panel 10 according to an exemplary embodiment of the present invention may be manufactured by forming waveform patterns longitudinally on a top plate 11 and a bottom plate 13, which are aluminum thin plates, overlapping the top plate 11 and the bottom plate 13, and then forming diagonal pressing portions 15a and 15b with regular intervals along the width direction on the top plate 11 and the bottom plate 13 such that the waveform patterns may be formed into triangle-patterned cells 17. In other words, in the configuration of the multi-layered composite panel 10, the top plate 11 and the bottom plate 13 may be independently manufactured by forming continuous waveform patterns with different heights in the longitudinal direction of aluminum thin plates without limitation.

The top plate 11 and the bottom plate 13 may be aluminum thin plates having the same thickness or aluminum thin plates having different thicknesses, without limitation. The thicknesses of the top plate 11 and the bottom plate 13 may be in a range of about 0.1 to 0.5 mm to reduce the weight. For the thickness of the top plate 11 and the bottom plate 13, one thickness of them may be in a range of about 0.3 to 0.35 mm and the other thickness may be in a range of about 0.125 to 0.15 mm, without limitation.

The waveform patterns may be continuous sine waveform patterns in one direction. Particularly, the waveform patterns of the top plate 11 and the bottom plate 13 may have the same pitch. The material of the aluminum thin plates may be, but not limited to, an aluminum material which have with 99% of purity. It is appreciated that the A1050-0 aluminum provides a range of options for selecting the aluminum material of the present invention. Further, the waveforms of the top plate 11 and the bottom plate 13 may be formed by roll forming process. By overlapping the top plate 11 and the bottom plate 13, a predetermined adiabatic layer S may be formed between the top plate 11 and the bottom plate 13 due to the difference in height of the waveform patterns. In particular, the adiabatic layer S may be formed at a predetermined height between the ridges of the top plate 11 and the ridges of the bottom plate 13 and between the grooves of the top plate 11 and the grooves of the bottom plate 13. The adiabatic layer may be composed of an air layer. Inorganic heat insulating material may be inserted into the adiabatic layer. The inorganic heat insulating material may comprise, for example, silicon dioxide powder ($SiO_2$ power), aluminum oxide power ($Al_2O_3$ power), vermiculite, silica, aerogel ($SiO_2$) or fumed silica ($SiO_2$).

Furthermore, in the top plate 11 and the bottom plate 13 overlapping with the adiabatic layer S therebetween, the diagonal pressing portions 15a and 15b which may be pressed one-directionally in the diagonal direction to cross each other may also be formed on the top of the top plate 11 and the bottom of the bottom plate 13 in the width direction perpendicular to the longitudinal direction. The diagonal pressing portions 15a and 15b may divide the waveform patterns on the top plate 11 and the bottom plate 13 into the unit of triangle-patterned cell 17. Particularly, the cells 17 may be formed such that triangular patterns are sequentially alternately arranged in the width direction on the top plate 11 and the bottom plate 13.

Each of triangular patterns may have the edge of the ridge and the groove of the cell 7 as one side and the diagonal pressing portions 15a and 15b may make the other equal sides. In particular, at the diagonal pressing portions 15a and 15b, the top plate 11 and the bottom plate 13 may be in contact with each other under pressure, such that the adiabatic layer S may be closed in the unit of the triangle-patterned cells by the diagonal pressing portions 15a and 15b, and thus, continuous closed adiabatic layers S may be uniformly obtained throughout the plates. Further, the centers of both sides connecting the groove and the ridge of each cell 17 may be pressed to each other by the opposite diagonal pressing portion 15a or 15b, such that undercut portions 19 may be formed on the overlapped top plate 11 and bottom plate 13.

In other words, the undercut portion 19 may be formed by both sides of the cell 17 of which the centers are pressed by the opposite diagonal pressing portion 15a or 15b to be pushed inward and which make a groove such that the top plate 11 and the bottom plate 13 are not separated in the up-down direction.

In the multi-layered composite panel 10 according to an exemplary embodiment of the present invention, since the top and the bottom of the cell 17 may be symmetric and discriminating the ridge and the groove may not be necessary. For the convenience of description, as described herein, the downward-convex portion may be the groove and the upward-convex portion may be the ridge in the waveform pattern as shown in the drawings. The multi-layered composite panel 10 may not be limited to two sheets of aluminum thin plates that are the top plate 11 and the bottom plate 13, respectively, but also may include more than three aluminum sheets of thinner plates without limitation.

Further, in the multi-layered composite panel 10, the adiabatic layer may not be limited to be formed by the difference in height of the waveform patterns between the top plate 11 and the bottom plate 13 but also may be formed with other supplemental materials. The other supplemental material may be, but not limited to, glass wool, polyurethane, and the like, which can absorb and block sound and block heat. The other materials, as disclosed herein, may be inserted between the top plate 11 and the bottom plate 13.

Figure 5:
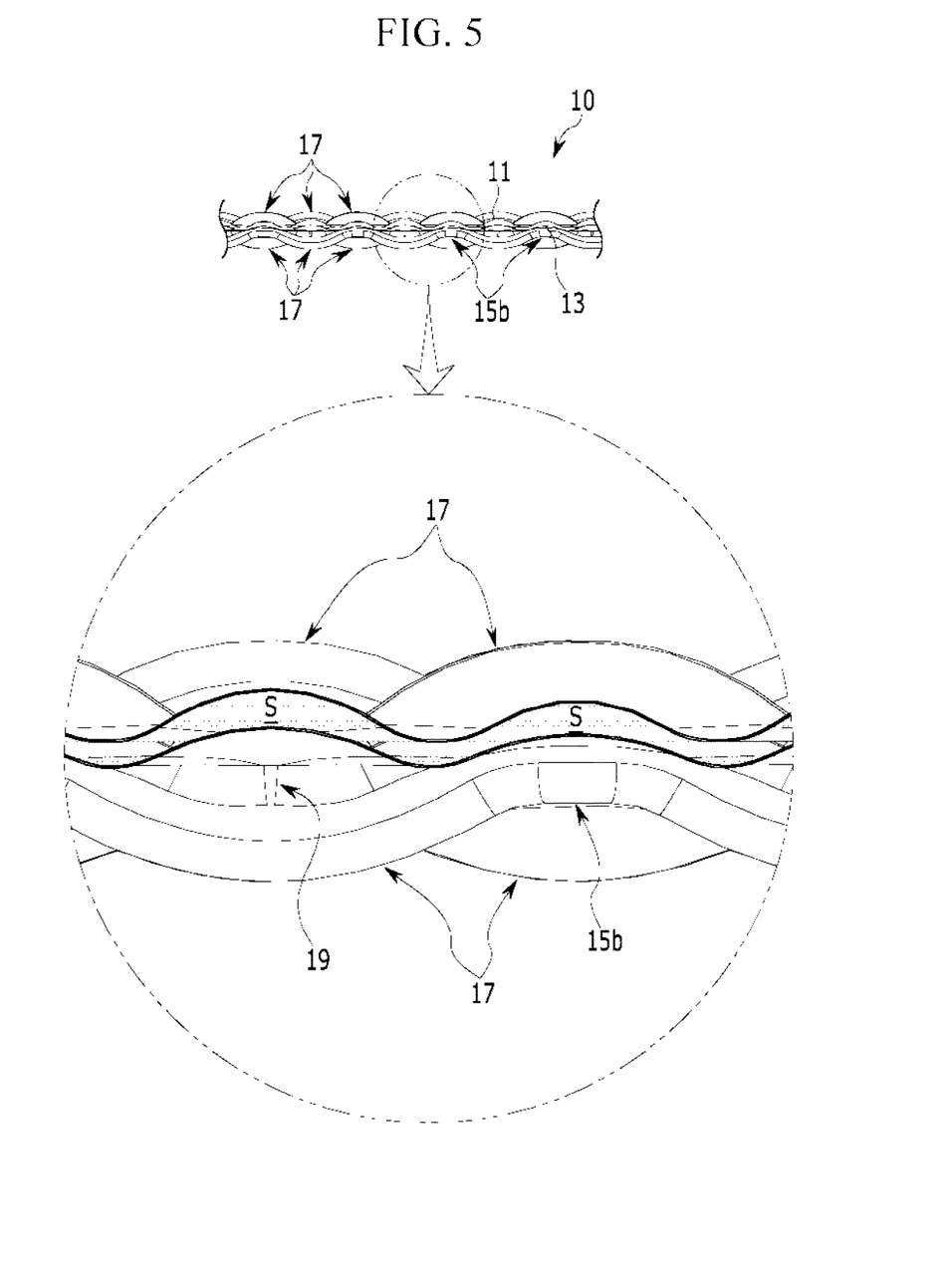
FIG. 5 is an exemplary cross-sectional view taken along line A-A in FIG. 4 according to an exemplary embodiment of the present invention.
Figure 6:
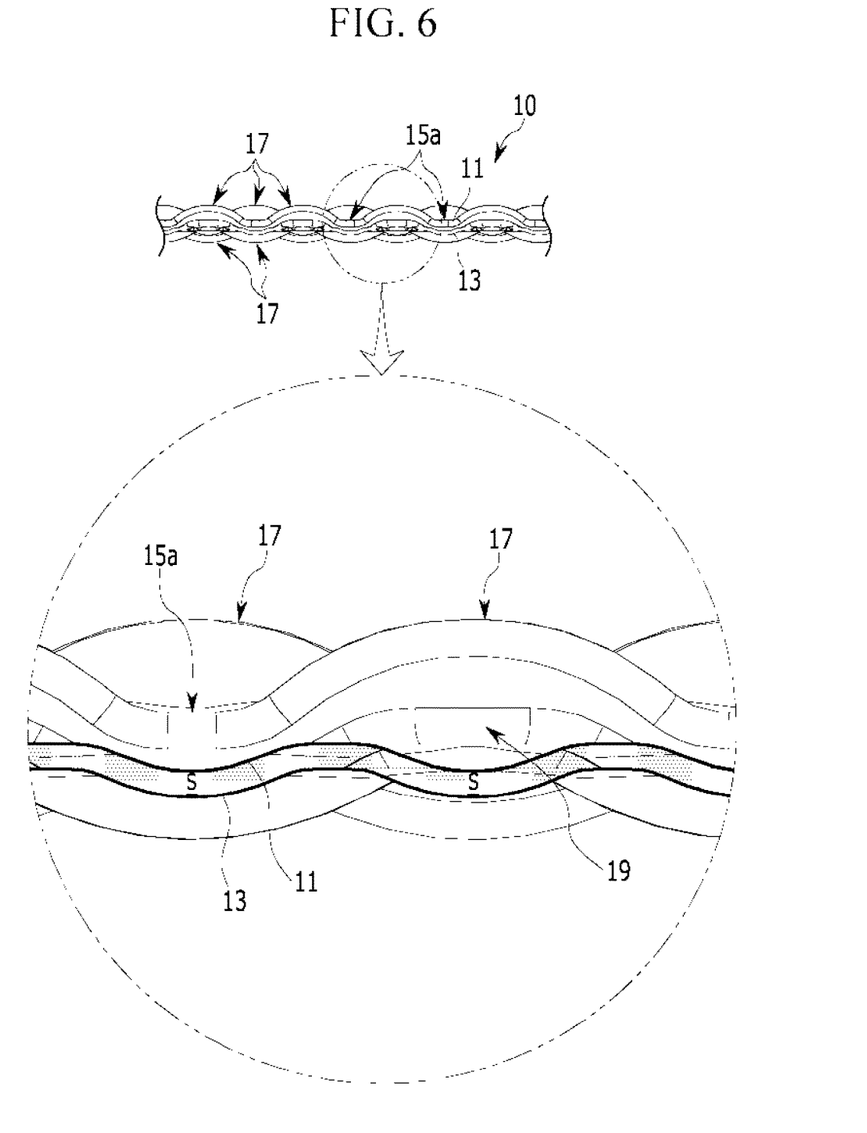
FIG. 6 is an exemplary cross-sectional view taken along line B-B in FIG. 4 according to an exemplary embodiment of the present invention.
Figure 7:
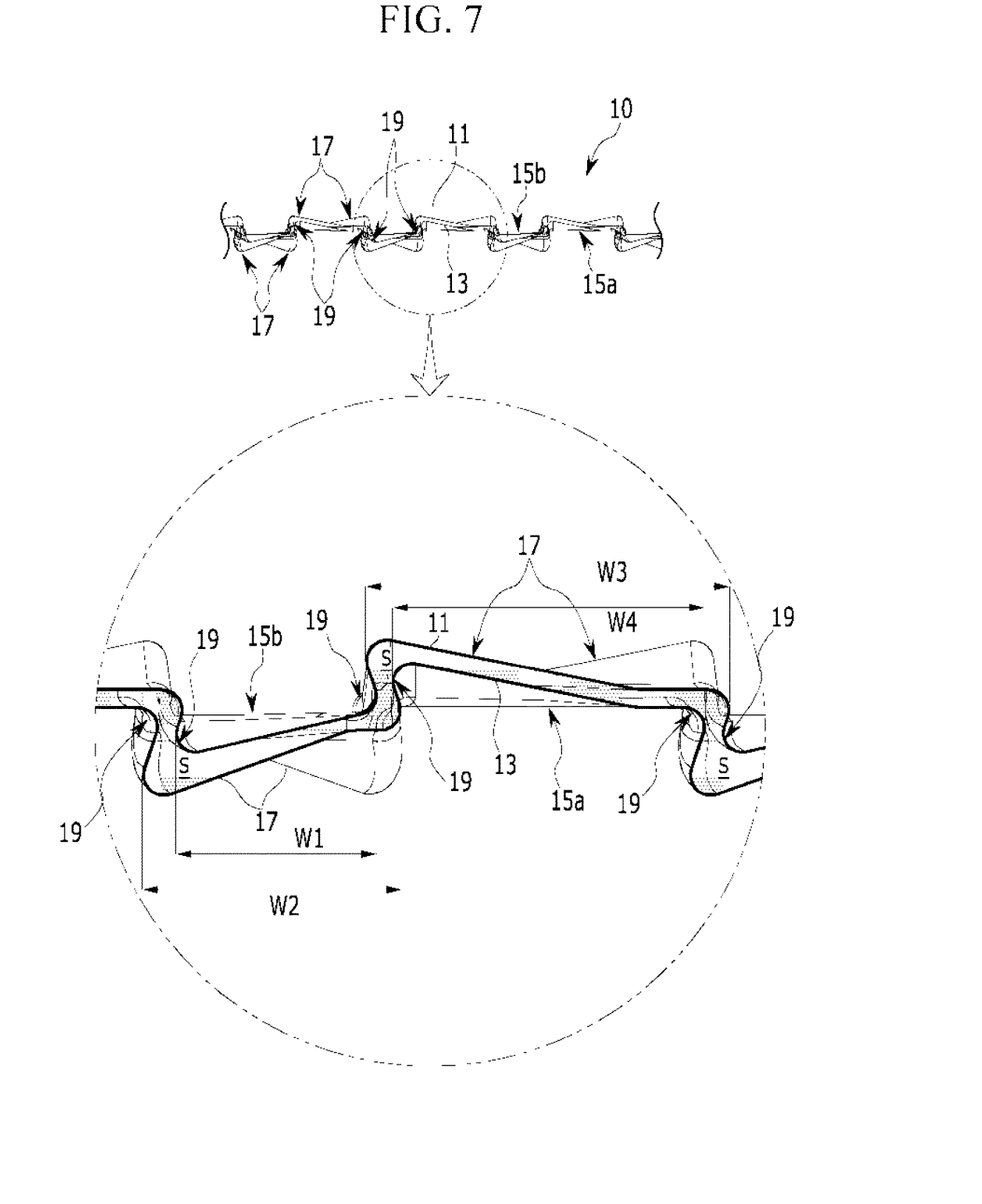
FIG. 7 is an exemplary cross-sectional view taken along line C-C in FIG. 4 according to an exemplary embodiment of the present invention.

FIGS. 5 to 7 illustrate exemplary cross-sectional views taken along lines A-A, B-B, and C-C in FIG. 4. FIGS. 5 and 6 are exemplary width-directional cross-sectional views of one ridge and one groove, respectively, in the longitudinal direction of the multi-layered composite panel 10. FIG. 7 is an exemplary longitudinal cross-sectional view of the intersection between the top and bottom diagonal pressing portions 15a and 15b in the width direction of the multi-layered composite panel 10.

Referring to FIG. 5, in the width-directional cross-section for one ridge in the longitudinal direction of the multi-layered composite panel 10 according to an exemplary embodiment of the present invention, the adiabatic layer S with a predetermined shape may be obtained by the spaced ridges of the waveform patterns of the top plate 11 and the bottom plate 13 and the undercut portion 19 may be pushed inside the adiabatic layer S by the intersection of the top and bottom diagonal pressing portions 15a and 15b.

Referring to FIG. 6, in the width-directional cross-section for one groove in the longitudinal direction of the multi-layered composite panel 10 according to an exemplary embodiment of the present invention, the adiabatic layer S with a predetermined shape may be obtained by the spaced grooves of the waveform patterns of the top plate 11 and the bottom plate 13 and the undercut portion 19 may be pushed inside the adiabatic layer S by the bottom diagonal pressing portion 15b.

Referring to FIG. 7, in the width direction of the multi-layered composite panel according to an exemplary embodiment of the present invention, the adiabatic layer S with a predetermined shape may be secured by the spaced grooves of the waveform patterns of the top plate 11 and the bottom plate 13 and the undercut portion 19 may be formed at both sides by the bottom diagonal pressing portion 15b, such that the pitch-directional widths W1 and W2 may be substantially reduced.

Furthermore, in the longitudinal direction for the intersection of the top and bottom diagonal pressing portions 15a and 15b, the top diagonal pressing portion 15a may be formed at each ridge of the waveform patterns of the top plate 11 and the bottom plate 13. Accordingly, the top plate 11 and the bottom plate 13 may be in contact and the pitch-directional widths W3 and W4 of the ridges may be maintained a predetermined levels.

In another aspect, the heat protector 1 may be manufactured from the multi-layered composite panel 10 by press-forming to corresponding to the external shapes of the parts in an exhaust system in a pressing process. Further, since the sides of the cells 17 are all regularly formed in the multi-layered plate 10 according to an exemplary embodiment of the present invention, stress concentration portion may not be generated during formation of the heat protector 1.

The adiabatic layer S between the top plate 11 and the bottom plate 13 may be substantially uniformly distributed in the unit of triangle-patterned cell 17. Further, the adiabatic layer S may remain in the unit of triangle-patterned cell 17 even after a formed heat protector is produced by pressing in less than about 50%, such that the adiabatic layer S may be obtained uniformly throughout the plates. Since the adiabatic layer S may improve the insulation effect substantially for the exhaust system, the effect of heat blocking at the early stage of engine start may be improved. Further, when the engine temperature is highly elevated to a critical temperature range, the effect of heat dissipation may also be substantially improved with the surface extension by the expanded beads 17 and with the substantial conductive property of aluminum.

Further, according to the multi-layered plate 10 in an exemplary embodiment, unlike the related art, since waveform patterns with different heights may be independently formed on the top plate 11 and the bottom plate 13, the closed adiabatic layers S are formed in the unit of triangle-patterned cells 17 by forming the diagonal pressing portions 15a and 15b with substantially regular intervals (e.g., predetermined intervals) in the diagonal direction to the forming direction of the waveform patterns, and the adiabatic layer S may be obtained in advance between the overlapping top plate 11 and the bottom plate 13, such that the thermal characteristic and the soundproofing characteristic of the formed heat protector may be improved.

Moreover, according to the multi-layered plate 10 according in an exemplary embodiment, triangular patterns divided by the diagonal pressing portions 15a and 15b may be regularly formed (e.g., formed at predetermined intervals) with the edge of ridge and the groove of each cell 17 as one side, such that forming directionality may be obtained substantially evenly in the diagonal direction together with the waveform direction when the heat protector is formed, thereby improving formability.

Figure 8:
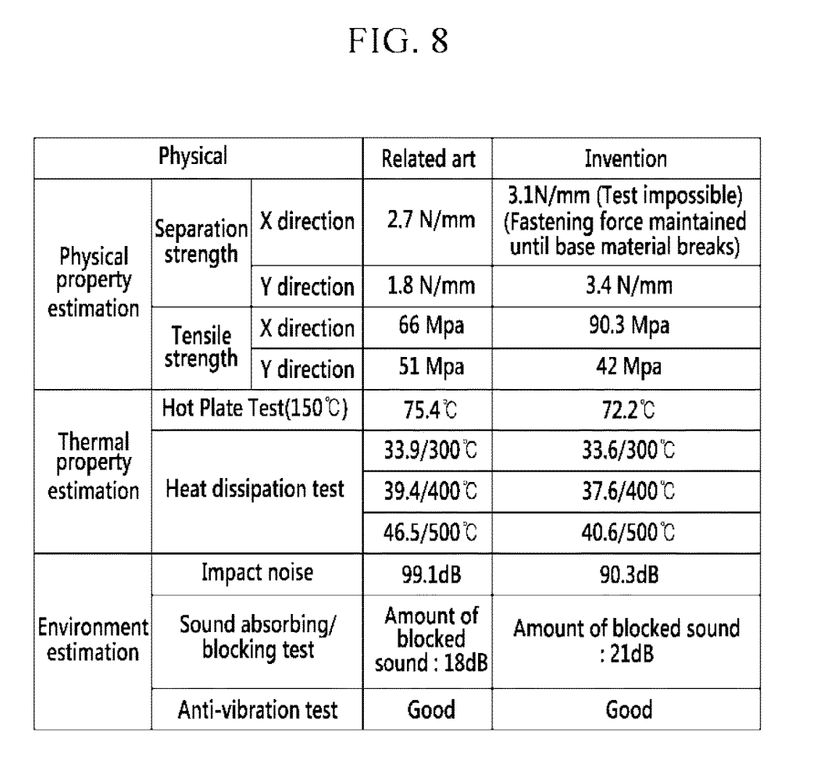
FIG. 8 is an exemplary table showing mechanical properties, thermal characteristics, and soundproofing characteristic of an exemplary multi-layered composite panel according to an exemplary embodiment of the present invention and a simple two-layered aluminum plate in the related art.

FIG. 8 is an exemplary table showing mechanical properties, thermal characteristics, and soundproofing characteristic of an exemplary multi-layered composite panel 10 having the air layer as the adiabatic layer S according to an exemplary embodiment of the present invention and a conventional two-layered aluminum plate with simple layered configuration in the related art. Particularly, as shown in FIG. 8, the strength of the multi-layered composite panel 10 according to an exemplary embodiment is substantially improved compared to the conventional two-layered aluminum plate.

The thermal characteristics were obtained by a hot plate test directly from a heat-generating source and by a heat source test in which the temperature of plates at about 25 mm from a heat-generating source were measured. In the hot plate test, as shown in FIG. 8, the intrinsic thermal conductive characteristic of aluminum were conserved same at the plates, but in the heat source test, the multi-layered composite panel in an exemplary embodiment of the present invention is improved in heat-blocking and heat-dissipating characteristics.

Since the elevated temperature is maintained in a range of about 300° C. or less, the heat-blocking characteristic may be improved substantially. In addition, the heat-dissipating characteristic is substantially improved in a range of 400° C. or greater, and improved thermal characteristic by reducing thermal damage may be obtained. In the noise and sound-proofing test, as shown in FIG. 8, a sound-absorbing/blocking test using impact noise value and impedance test were performed. The impact noise may be improved by about 10% in the present invention in comparison to the related art and the sound-blocking characteristic may be also improved by about 20%. Accordingly, soundproofing ability from by the uniform air layer and offset of sound energy caused by vibration of the aluminum plates may be obtained, even without using a sound-absorbing/blocking member.

Figure 9:
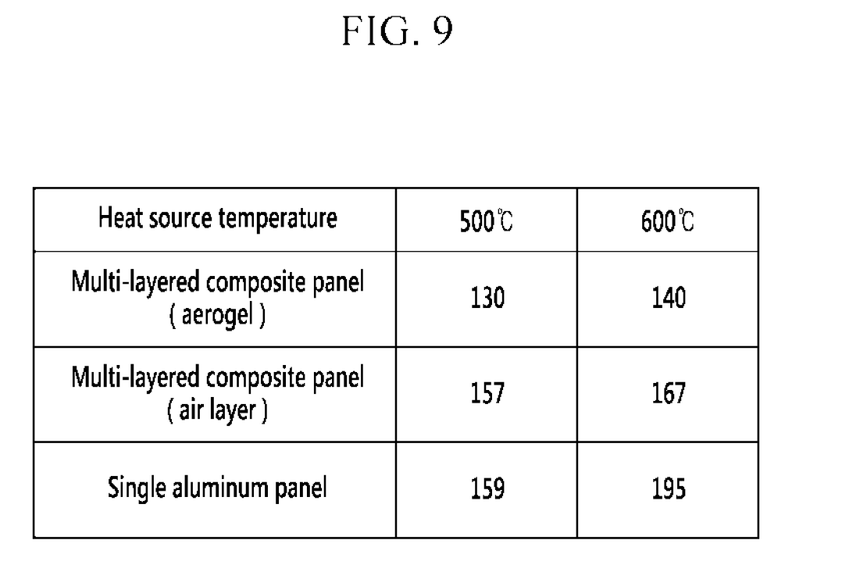
FIG. 9 is an exemplary table showing heat insulting performance test results from an exemplary multi-layered composite panel with each of aerogel and air layer as heat insulating layer according to an exemplary embodiment of the present invention and a single aluminum panel in the related art.

Referring to FIG. 9, performed was heat insulting performance test on the multi-layered composite panel with each of aerogel and air layer as heat insulting layer, and a single aluminum panel. In the state that test objects are spaced apart heat source with an interval of 10 mm, temperature test was performed at the position spaced as much as 25 mm from the test objects. The test results indicates that the multi-layered composite panel with aerogel heat insulting layer shows the highest heat insulting performance, and next the multi-layered composite panel with an air layer compared to the single aluminum panel according to the prior art.

According to various exemplary the multi-layered composite panel 10 of the present invention, the heat protector having improved anti-thermal damage may be manufactured by the heat-blocking and heat-dissipating abilities which are significantly improved in comparison to the related art. Moreover, the heat protector may have substantially improved soundproofing ability by forming uniform air layer using the material for the composite panel, such that the manufacturing cost can be reduced.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the appended claims.

What is claimed is:

1. A multi-layered composite panel, comprising
   at least two sheets of thin plates, wherein the two sheet of thin plates include continuous waveform patterns having the same pitch and different heights in one direction and are overlapped, and an adiabatic layer is formed between the overlapping thin plates;
   diagonal pressing portions, which divide the waveform patterns on the top and the bottom of the thin plates into the unit of triangle-patterned cell by being pressed diagonally to cross each other on the top and the bottom of the thin plates overlapping in the diagonal direction crossing the direction of the waveform patterns, are formed; and
   an undercut portion is formed by pressing the centers of both sides connecting a groove and a ridge of each cell on the top and the bottom of the thin plates with opposite diagonal pressing portions.

2. The multi-layered composite panel of claim 1, wherein the adiabatic layer is formed to be closed in the unit of triangle-patterned cell between the overlapping thin plates by the diagonal pressing portions between the ridge and the ridge and between the groove and the groove.

3. The multi-layered composite panel of claim 1, wherein the overlapping thin plates are a top plate and a bottom plate, which are made of aluminum.

4. The multi-layered composite panel of claim 1, wherein the overlapping thin plates are a top plate and a bottom plate which have about the same thickness.

5. The multi-layered composite panel of claim 1, wherein the overlapping thin plates are a top plate and a bottom plate which have different thicknesses.

6. The multi-layered composite panel of claim 1, wherein the waveform pattern is a sine waveform pattern continuous in one direction.

7. The multi-layered composite panel of claim 1, wherein the diagonal pressing portions are formed by pressing, in the zigzag shape on the top and the bottom of the overlapping thin plates.

8. The multi-layered composite panel of claim 1, wherein at the diagonal pressing portions, the thin plates are in contact with each other.

9. The multi-layered composite panel of a claim 1, wherein the cell unit includes a triangle-patterned closed air layer formed between the overlapping thin plates by the diagonal pressing portions between the ridge and the ridge and between the groove and the groove.

10. The multi-layered composite panel of claim 1, wherein the crossing diagonal directions have an acute angle and an obtuse angle with respect to the direction of the waveform patterns.

11. The multi-layered composite panel of claim 1, wherein the adiabatic layer is configured to be an air layer or filled with inorganic heat insulting material including at least one of silicon dioxide powder ($SiO_2$ power), aluminum oxide power ($Al_2O_3$ power), vermiculite, silica, aerogel ($SiO_2$), or fumed silica ($SiO_2$).

12. A multi-layered composite panel, comprising:
    a uniform adiabatic layer formed between a top plate and a bottom plate, which are aluminum thin plates with continuous waveform patterns having the same pitch and different heights and overlap each other;
    diagonal pressing portions, which divide the waveform patterns on the top plate and the bottom plate into the unit of triangle-patterned cell by being pressed diagonally to cross each other on the top of the top plate and the bottom of the bottom plate overlapping in the diagonal direction crossing the direction of the waveform patterns, are formed; and
    an undercut portion is formed by pressing the centers of both sides connecting a groove and a ridge of each triangle-patterned cell on the overlapping top and bottom plates with opposite diagonal pressing portions.

13. The multi-layered composite panel of claim 12, wherein the adiabatic layer is formed to be closed in the unit of triangle-patterned cell between the ridges and between the grooves of the overlapping top and bottom plates by the diagonal pressing portions.

14. The multi-layered composite panel of claim 12, wherein the top plate and the bottom plate are about the same in thickness.

15. The multi-layered composite panel of claim 12, wherein the top plate and the bottom plate are different in thickness.

16. The multi-layered composite panel of claim 12, wherein the waveform pattern is a sine waveform pattern continuous in one direction.

17. The multi-layered composite panel of claim 12, wherein at the diagonal pressing portions, the top plate and the bottom plate are in contact with each other.

18. The multi-layered composite panel of claim 12, wherein the cell unit includes a triangle-patterned closed air layer formed between the ridges and between the grooves of the overlapping top and bottom plates, by the diagonal pressing portions.

19. A heat protector of a vehicle manufactured using the multi-layered composite panel of claim 1.

20. A method of manufacturing a heat protector of a vehicle, comprising:
    press-forming to an external shape of the heat protector in a pressing process using the multi-layered composite panel of claim 1.

\* \* \* \* \*